United States Patent [19]
Howell

[11] 3,943,895
[45] Mar. 16, 1976

[54] BARREL TYPE INTERNAL COMBUSTION ENGINE

[76] Inventor: Roy M. Howell, 115 Meadbrook Road, Garden City, N.Y. 11530

[22] Filed: Nov. 29, 1974

[21] Appl. No.: 528,342

[52] U.S. Cl. ..... 123/58 AA; 123/190 A; 123/190 D; 123/196 R; 123/325 T
[51] Int. Cl.² ......... F02B 75/26
[58] Field of Search .......... 123/58 R, 58 A, 80 BB, 123/190 D, 190 A, 196 R, 190 BE, 325 T, 75 B, DIG. 4

[56] References Cited
UNITED STATES PATENTS

| | | | |
|---|---|---|---|
| 1,694,938 | 12/1928 | Harris | 123/58 BB |
| 2,155,455 | 4/1939 | Thoma | 123/58 R |
| 2,305,874 | 12/1942 | Isley | 123/190 DL X |
| 2,567,576 | 9/1951 | Palumbo | 123/58 AB |
| 3,107,541 | 10/1963 | Parsus | 123/58 A |
| 3,171,509 | 3/1965 | Girodin | 123/58 BA |

*Primary Examiner*—Wendell E. Burns
*Assistant Examiner*—William C. Anderson
*Attorney, Agent, or Firm*—Eisenman, Allsopp and Strack

[57] ABSTRACT

An axial cylinder internal combustion engine having a cylindrical cam is provided with special cam roller followers subjected to oil under pressure to keep them in close operating contact with the radial cam surfaces. Oil pressure is also used to maintain the pistons in contact with the circumferential cam surface. The engine further includes a rotary valve for supplying a stratified charge to each cylinder and unique means for continuously lubricating the valve face.

13 Claims, 8 Drawing Figures

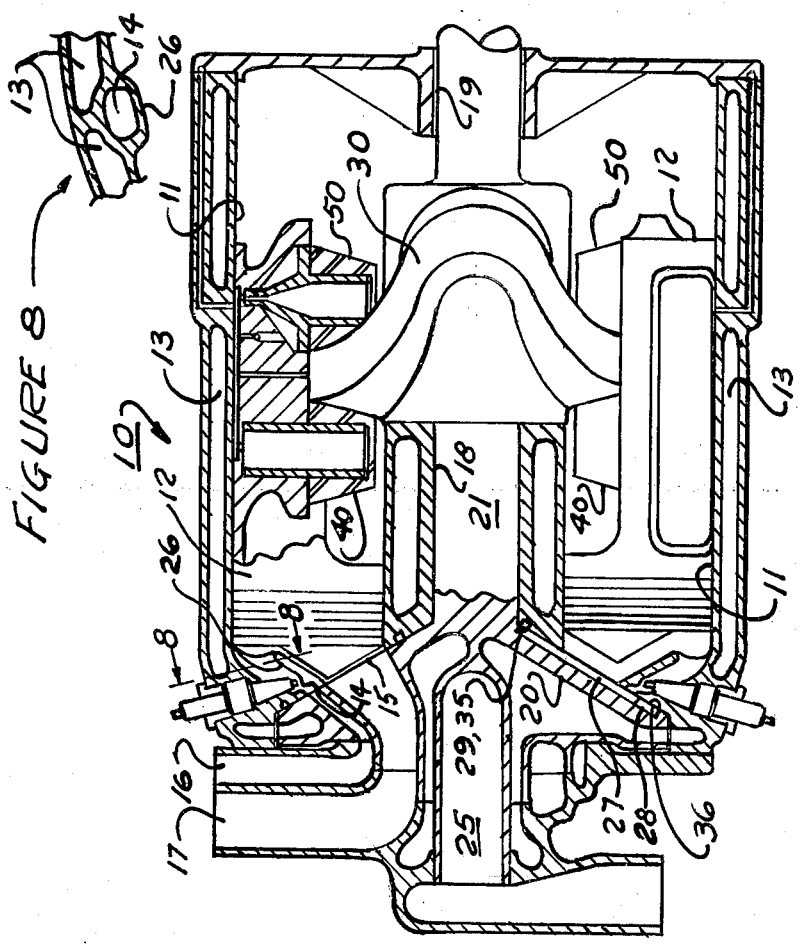
FIGURE 1
FIGURE 8
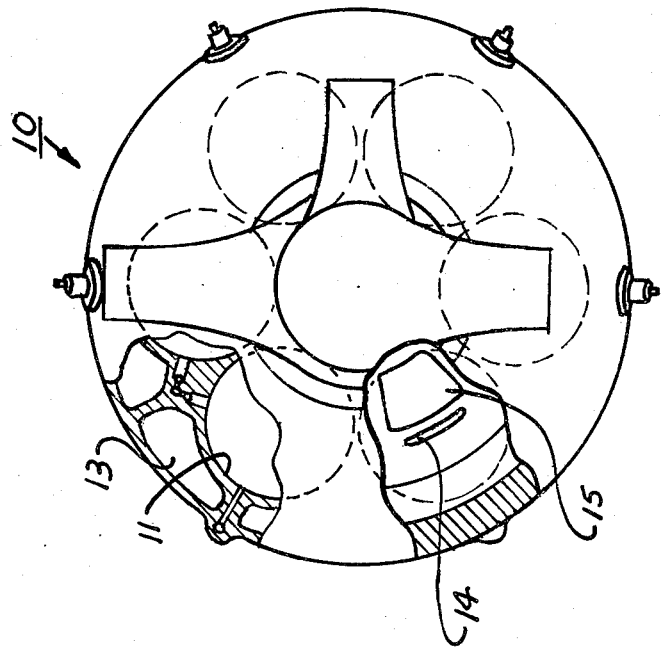
FIGURE 2

BARREL TYPE INTERNAL COMBUSTION ENGINE

BACKGROUND OF THE INVENTION

1. Field of the Invention

The invention relates to internal combustion engines having the cylinders parallel to the shaft; more particularly, it relates to such axial cylinder engines, which use a cylindrical cam driven by roller followers attached to the pistons.

2. Description of the Prior Art

Many styles of axial cylinder internal combustion engines wherein the cylinders are parallel to, and equidistant from, the main engine shaft have been developed. Such machines have been known in the past as barrel engines or simply round engines, because their distinguishing characteristic is the circular or cylindrical arrangement of the elements. Frequently, these engines are designed for conventional four cycle operation. A cylindrical cam couples the pistons to the drive shaft. Where ridge cams are used, cam followers on each piston track the radial surfaces of the rotating cam.

These engines contain inherent advantages of low cost, light weight, and small volume. Nevertheless, they have not been commercially successful. In axial cylinder engines, sharp load reversals are experienced by the reciprocating pistons, and such load reversals, particularly where accompanied by excessive clearance requirements, result in hammering contact at mating surfaces, noisy operation, and short life. To a large extent, the past deficiencies of these engines can be traced to the relatively large variations in the clearances among the mating parts due to manufacturing tolerances, thermal distortions and wear.

Rotary valves are well adapted for use with axial cylinder engines. They are simple and also compatible from the standpoint of low cost, high volumetric efficiency and quiet operation. While useful in a variety of rotary engines and developed in many forms, here too, no suitable engines have been produced, at least partly due to the excessive friction, sealing problems, overheating, and scoring which may be attributed to inadequate distribution of lubricants to the rubbing surfaces.

Those familiar with engine development also recognize the many attempts and the partial success that has been experienced in the utilization of stratified charges. Stratified charges are employed to achieve maximum ignition characteristics, efficient use of fuel, and complete combustion. Typically, the stratified charges are supplied to separate or distinct sections of a combustion chamber such that a richer fuel mixture will be ignited within a first section and a leaner mixture will thereafter be ignited in the second.

SUMMARY OF THE INVENTION

The present invention brings together the general art of axial cylinder engines, rotary valves, and stratified charge delivery in a combination which produces a simple and efficient engine structure. This combination yields the advantages of the axial cylinder engine, the efficiency and quiet operation of rotary valves, and the high efficiency and maximum fuel utilization available through the use of stratified charges.

An object of the present invention is to provide an improved axial cylinder internal combustion engine.

Another object of the invention is to provide an improved axial cylinder engine with a minimized noise level, maximized service life, and ease of manufacture.

A more specific object of the invention is to provide an improved axial cylinder engine of the cylindrical cam type employing hydraulically positioned cam rollers, and pistons in order to minimize the effects of manufacturing tolerances and thermal distortions.

Another specific object of the invention is to provide an improved axial cylinder engine having a rotary valve structure with improved lubrication means.

Yet another object of the present invention is to provide an axial cylinder engine provided with a rotary valve and stratified charge system whereby the charge is stratified within each cylinder.

In accordance with one feature of the invention there is provided an axial cylinder engine having a cylindrical cam and cam follower rollers coupled to the pistons within each cylinder. Lubricant channels and ports are provided for supplying lubricant under pressure to the cam followers in order to urge them into contact with the camming surface.

In accordance with another feature of the invention there is provided an axial cylinder engine having a rotary valve coupled to the drive shaft and positioned at the cylinder head end of the engine. Each combustion chamber is partitioned into ignition and combustion sections, with separate valve ports to each section. Ignition means, such as a spark plug, is provided in each ignition section and the rotary valve selectively opens the ignition and combustion section ports to rich and lean fuel mixtures respectively, as the drive shaft rotates.

The rotary valve arrangement of the invention also features reciprocating lubrication means disposed within a slot or slots in the valve face. These means engage a camming groove in the engine block and effect a wiping action at the interface with the valve and thus insure continuous surface lubrication.

The enumerated objects and features of the invention as well as additional unique aspects of a particular illustrative embodiment will be more fully understood and appreciated from the following description which is made in conjunction with the attached drawings.

BRIEF DESCRIPTION OF THE DRAWINGS

FIG. 1 is a schematic representation of a longitudinal section taken through an axial cylinder internal combustion engine embodying the present invention;

FIG. 2 is a front end view of the engine illustrated in FIG. 1 with cut-away portions revealing the dual intake ports and the check valves supplying oil to the pistons;

FIG. 8 is a partial cross-section through the cylinder head taken along the lines 8—8 of FIG. 1, showing the pocket which isolates the rich fuel mixture within the main combustion chamber.

DESCRIPTION OF THE PREFERRED EMBODIMENT

Figure 3:
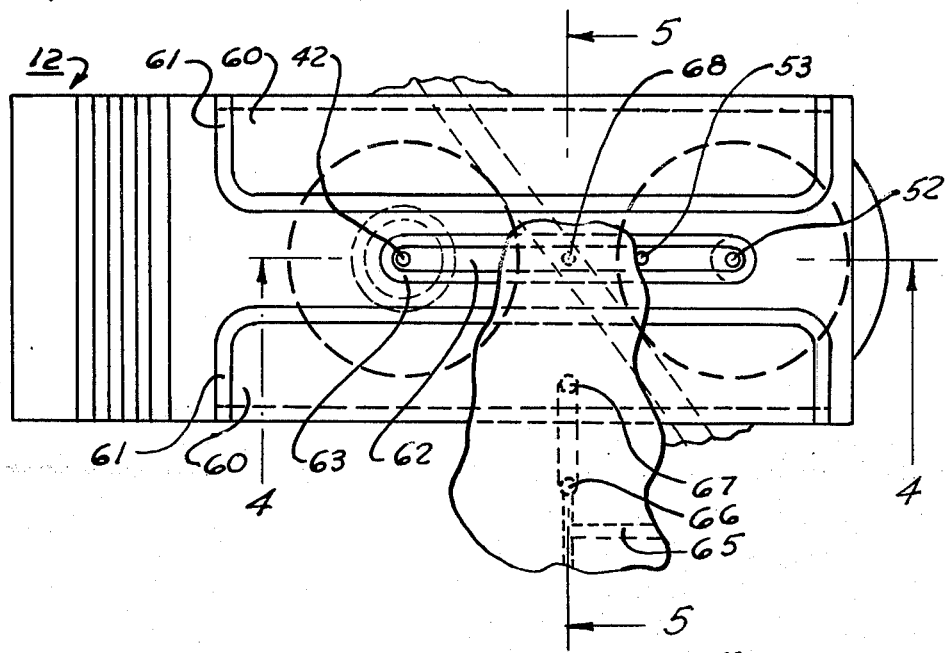
FIG. 3 is an enlarged view of a typical piston employed in an engine embodying the invention, wherein a portion of the cylinder block is illustrated to show the arrangement of the oil entrapment and transfer compartment seals.

The axial cylinder engine 10 of FIGS. 1 and 2, has a plurality of cylinders 11 disposed about its periphery. Each cylinder contains a reciprocating piston 12. The engine block is provided with cooling channels 13, through which cooling fluid may be circulated in the known manner. The head of each cylinder is divided into sections to maintain fuel-mixture separation until after ignition. Thus, FIGS. 1 and 8 show the rich fuel-mixture cylinder port 14 and FIG. 1 shows lean fuel-mixture cylinder port 15. These passages are completed to the fuel-mixture intake system via input ports 16 and 17 respectively.

The shaft 21 of the rotating valve assembly 20 is mounted along the axis of the engine in bearings 18 and 19. Cylindrical cam 30 is secured to shaft 21 and imparts rotation thereto, so that the valve assembly and reciprocating piston movement are coordinated to effect four cycle operation. Cam rollers 40, 50, associated with each piston, couple the piston movement to the tapered side walls 31, 32 of the cam 30.

In a typical operating cycle a "rich" fuel-mixture is supplied to annular input passage 16 and a lean fuel-mixture is supplied to annular input passage 17. Rotary valve assembly 20 successively connects the input passages to each cylinder, durin the intake stroke. The fuel-mixture is then compressed and a spark is applied at the proper time to ignite the rich mixture. Details of timing and ignition are well known in the art and need not be explained herein. The burning rich mixture ignites the lean mixture to develop the combustion stroke, driving piston 12 to the right. On the return stroke, valve assembly 20 vents the cylinder via the single central exhaust passage 25.

The features which enable the present invention to improve the operating cycle, may be considered individually.

First, fuel stratification is effected by configuring the rich fuel-mixture input section at the head of each cylinder to keep the small amount of rich fuel-mixture substantially separated from the lean fuel-mixture until after ignition. Port 14 is much smaller and is effectively obstructed from the cylinder interior by partition 26.

Figure 7:
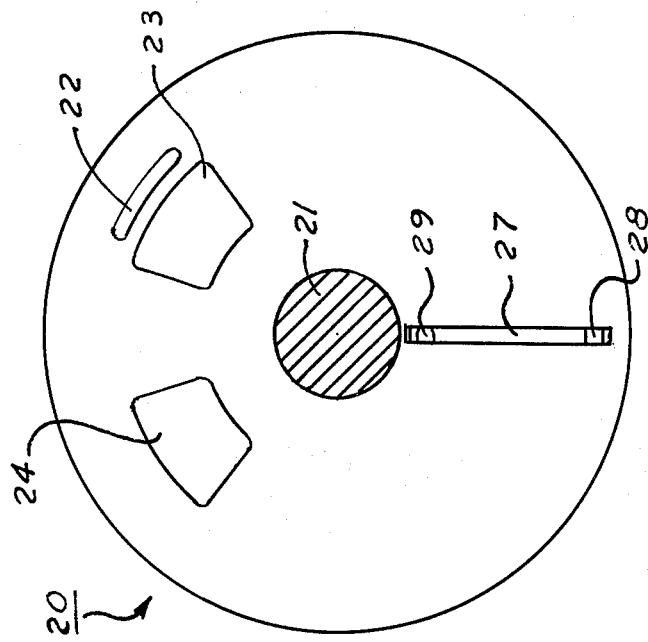
FIG. 7 is a view of the rubbing surface of the rotary valve shown in FIG. 6.
Figure 6:
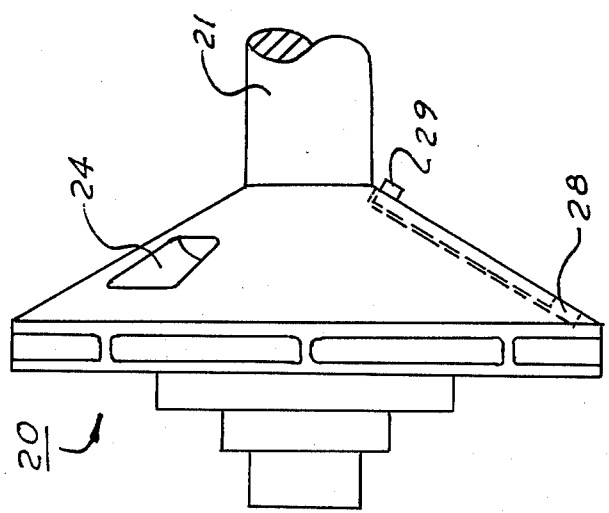
FIG. 6 is a side view of the rotary valve and shaft of an engine embodying the invention.

The functioning of valve assembly 20 will be better appreciated by examination of FIGS. 6 and 7. Valve port 22 is dimensioned to interconnect the rich fuel-mixture annular passage 16 to cylinder port 14 and valve port 23 is dimensioned to interconnect the lean fuel-mixture annular input passage 17 to cylinder port 15. The valve assembly rotates counterclockwise, as viewed in FIG. 7, and thus valve exhaust port 24 interconnects the cylinder head to the exhaust passage 25 at the end of each operating cycle.

The important function of lubricating the valve surface is accomplished with an oil spreader bar 27 mounted in a radial slot 28 on the face of the valve plate. Bar 27 has a projection 29 at one end, adapted to project into a mating sinusoidal groove 35 in the face of the engine block. Oil is supplied under pressure to slot 28 via a passage 36. Thus, as the valve assembly rotates, the sinusoidal groove 35 causes radial reciprocation of bar 27 and oil is continuously spread across the mating surfaces of the valve assembly and block. Bar 27 may ride freely within slot 28, or it may be pressed into contact with the opposed engine block face by a flat spring or similar biasing element. Clearly, the length of bar 27 and the amplitude of sinusoidal groove 35, determine the surface area swept by the lubrication bar.

Figure 4:
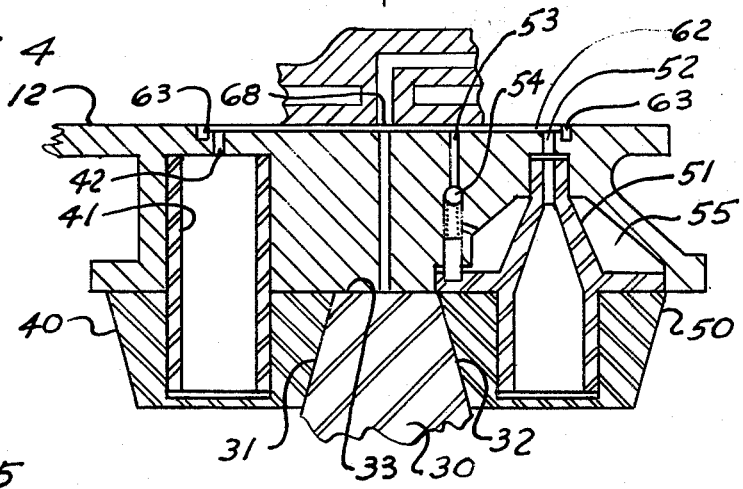
FIG. 4 is an enlarged cross-section taken along the lines 4—4 of FIG. 3 showing the cam follower portions of a piston, the adjacent cylinder wall, and the cylindrical cam.
Figure 5:
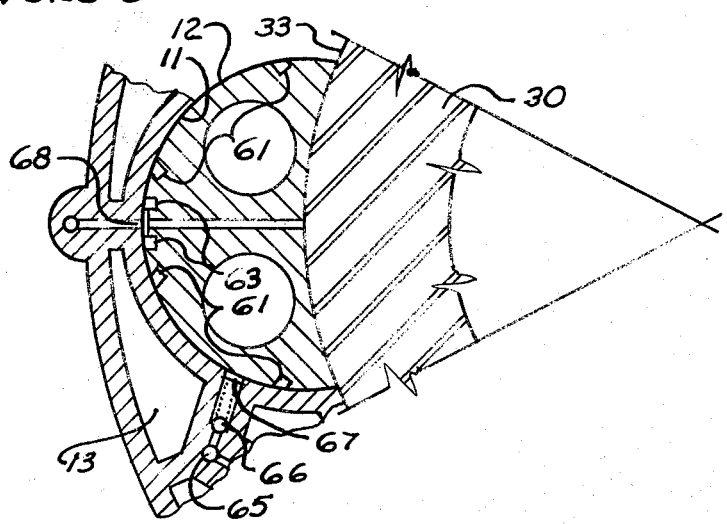
FIG. 5 is an enlarged cross-section taken along the lines 5—5 of FIG. 3 showing the ports and check valves for entrapment of lubricant between the cylinder walls and piston.

Having described the manner in which fuel-mixture is admitted to the cylinders 11 and ignited to drive the pistons 12, consideration must be given to the structure which couples the linear piston movement to cylindrical cam 30. It is conventional in engines of this type to utilize tapered roller cam followers attached to the pistons and engaging conforming sloped faces of a nominally sinusoidal cam ridge which is configured to accommodate the four piston strokes required for a four cycle engine. The present engine employs unique hydraulically driven roller followers 40, 50 as shown in FIGS. 1 and 4. Each follower is coupled to its piston, as shown in FIG. 4, by pins 41 and 51. Each piston 12 bears against the outer diameter or circumferential face 33 of cam 30. The skirts of the pistons 12 are configured to the contour of the cam ridge 33 as illustrated in FIG. 5.

In accordance with the invention, each piston 12 is provided with oil entrapment areas 60 which are formed by mounting continuous flexible sealing elements 61 in bearing contact against the adjacent cylinder wall. These sealing elements are affixed within suitable grooves in the piston skirt. In addition, each piston is provided with an oil pressure transfer area 62 which is similarly formed by mounting a continuous cylinder-wall-contacting flexible sealing element 63 within a groove in the piston skirt. These elements and their position are shown from various aspects in FIGS. 3, 4, and 5.

The cylinder block contains oil pressure galleries 65 which supply oil under pressure through check valves 66 to oil transfer holes 67 in each cylinder wall. Holes 67 are positioned to remain in registry with the oil entrapment areas 60 throughout the entire piston travel. Similarly, the cylinder block contains oil pressure galleries terminating in oil pressure holes 68 (FIG. 5) positioned in the cylinder wall to continuously register through the piston travel with the oil pressure transfer area 62.

Within each piston, oil passages 42 and 52 lead from the pressure transfer area 62 to the hollow follower pins 41, 51. Thus, oil from the main oil distribution system is supplied under pressure to the roller cam followers 40, 50. Each piston is also provided with an oil passage 53 fitted with a check valve 54 to feed oil irreversibly from area 62 to a chamber 55 in which the follower pin 51 is axially slidable.

It is known that in reciprocating piston engines of this type, both gas pressure and inertia loads on the pistons pass from peak value to substantially zero at least once during each operating cycle of four strokes. With the roller followers 40, 50 and the sloping faces 31, 32 of cam 30 configured for minimum sliding contact as shown, these load produce components which tend to drive the pistons and their followers radially away from the cam. However, the oil pressure maintained at the oil transfer hole 68 causes oil to flow through the check valve 54 into the chamber 55 to force the follower pin 51 and its connected follower roller 50 radially inward into contact with the mating surface 32 of cam 30 whenever the outward load component on the follower is relatively low. When the outward load component on the follower 50 rises above the oil-pressure-created inward force, retreat of the follower from its position of contact with the cam is prevented by the oil in chamber 55 and the unidirectional nature of check valve 54. Thus, follower 50 is maintained in direct contact with the face of cam 30 throughout an entire load range.

The structure and hydraulic linkage of this invention is designed to maintain oil at suitable pressure by conventional pump means so that the oil flows from the oil gallery 65 in the block through check valve 66 into oil entrapment areas 60 in each piston 12 when the radially outward piston load component is relatively low. This oil under pressure is trapped within the space between the piston 12, the cylinder wall 11, and the sealing element 61, and effectively forces the piston 12 radially inward to assure firm contact with the outer surface 33 of cam 30. When the outward radial component of the piston load rises above the inward radial component produced by oil pressure in the oil entrapment areas 60, oil is prevented from flowing out of the entrapment areas by the unidirectional characteristic of check valve 67. The trapped oil prevents any substantial movement of the piston away from the cam 30. Direct contact between the piston 12 and the cam is thus maintained over the operating range of the engine and compensates for any manufacturing tolerances or thermal distortion that may be created during operation.

It should be understood that sufficient leakage is provided in both the oil entrapment areas 60 and the cam follower chambers 55 to accommodate the reduction in piston, follower and cam clearances, caused by temperature increases.

A particular embodiment of the invention has been shown and described. In several instances, references were made to modifications that would occur to those skilled in the art. Such modifications as well as numerous others, will be apparent. All modifications which come within the spirit and teachings of this disclosure, are intended to be covered by the following claims.

What I claim is:

1. An axial cylinder internal combustion engine having a reciprocating piston within each cylinder, a cylindrical cam having a fixed outside diameter, and radially extending camming surfaces; a pair of cam followers each in bearing contact with one of said camming surfaces and coupled to one of said pistons; said cam followers having a tapered surface conforming to the mating surface of said cam; a source of oil under pressure; an oil gallery behind at least one of said cam followers; and means for admitting oil to said gallery to force said one cam follower inwardly and into contact with the camming surface of said cam.

2. An axial cylinder internal combustion engine as defined in claim 1, wherein said oil gallery is connected to said source of oil via a check valve which admits oil to said gallery only.

3. An axial cylinder internal combustion engine as defined in claim 2, wherein each said piston further includes an axially disposed oil gallery in fluid communication with a port in the cylinder wall, said source of oil being connected to said port to supply oil thereto, said axially disposed oil gallery being interposed between said source of oil and said check valve.

4. An axial cylinder internal combustion engine as defined in claim 3, wherein the portion of said piston between said cam followers is configured to conform and bear against the outside circumferential surface of said cam, a second oil gallery on the surface of said piston remote from that which bears against said cam, and means for admitting oil to said second oil gallery to force said piston inwardly and into contact with said circumferential surface.

5. An axial cylinder internal combustion engine as defined in claim 4, wherein said second oil gallery is connected to said source of oil via a check valve which admits oil to said second gallery only.

6. An axial cylinder internal combustion engine as defined in claim 1, wherein the portion of said piston between said cam followers is configured to conform and bear against the outside circumferential surface of said cam, a second oil gallery on the surface of said piston remote from that which bears against said cam, and means for admitting oil to said second oil gallery to force said piston inwardly and into contact with said circumferential surface.

7. An axial cylinder internal combustion engine as defined in claim 6, wherein said second oil gallery is connected to said source of oil via a check valve which admits oil to said second gallery only.

8. An axial cylinder internal combustion engine as defined in claim 1, further comprising a rotary valve coupled to rotate with said cylinder cam, said valve having a surface in contact with the cylinder head portion of said engine, and, said surface having ports therein to selectively control fuel input and exhaust output from each cylinder.

9. An axial cylinder internal combustion engine as defined in claim 8, including a reciprocating lubricating element mounted for movement within a radial slot in the surface of said rotary valve.

10. An axial cylinder internal combustion engine as defined in claim 9, comprising a circumferential groove in the cylinder head portion of said engine facing said valve, a projection from said lubricating element into said groove to effect said movement as the valve rotates, and means for supplying oil to said slot.

11. An axial cylinder internal combustion engine as defined in claim 8, wherein said valve ports comprise an exhaust port positioned to establish fluid communication between each cylinder and a central exhaust passage once during each operating cycle of said engine, and two fuel input ports positioned to establish fluid communication between separate fuel input passages and segregated portions at the upper end of each cylinder, during each operating cycle of said engine.

12. An axial cylinder internal combustion engine as defined in claim 11, wherein a smaller one of said segregated portions is provided in proximity to ignition means and a larger one of said segregated portions is in fluid communication with said smaller portion and possesses complete access to the face of the piston in each cylinder.

13. An axial cylinder internal combustion engine as defined in claim 12, in combination with means for supplying a rich fuel-mixture to the fuel input passage connected to said smaller segregated portion, and means for supplying a lean fuel-mixture to the fuel input passage connected to said larger segregated portion.

* * * * *